United States Patent [19]

Bailey et al.

[11] 4,222,072
[45] Sep. 9, 1980

[54] VIDEO PLAYER/RECORDER WITH NON-LINEAR MARK LENGTH MODULATION

[75] Inventors: Jack H. Bailey, Millbrook; Gerald H. Ottaway, Pleasant Valley, both of N.Y.

[73] Assignee: DiscoVision Associates, Costa Mesa, Calif.

[21] Appl. No.: 974,183

[22] Filed: Dec. 28, 1978

[51] Int. Cl.² ............................................. H04N 5/76
[52] U.S. Cl. ................................. 358/128.5; 360/24; 360/32; 360/38; 360/40; 371/2
[58] Field of Search .................. 358/128, 8; 360/24, 360/32, 33, 38, 39, 40, 48; 340/146.1 F

[56] References Cited

U.S. PATENT DOCUMENTS

| 4,022,986 | 5/1977 | Teer et al. ........................... 360/32 X |
| 4,146,099 | 3/1979 | Matsushima et al. ............. 360/32 X |
| 4,161,753 | 7/1979 | Bailey et al. ........................ 358/128 |

Primary Examiner—Bernard Konick
Assistant Examiner—Donald McElheny, Jr.
Attorney, Agent, or Firm—W. S. Robertson

[57] ABSTRACT

In a video disk system a mark along a record data track is modulated in length to represent multi-bit binary code blocks of a first length (such as three or four bits) and the player system associated with the disk operates in multi-bit code blocks that are generally longer (for example eight bits) so that two marks on the disk may represent a single code block in the associated system. The bits of the code block in the associated system are assigned to bit positions of the appropriate number of marks on the disk in a way that minimizes the effect of errors in the operation of initially writing or subsequently reading a mark. The increments of mark length are also made non-linear to further minimize the effect in the associated system of errors in mark length.

8 Claims, 3 Drawing Figures

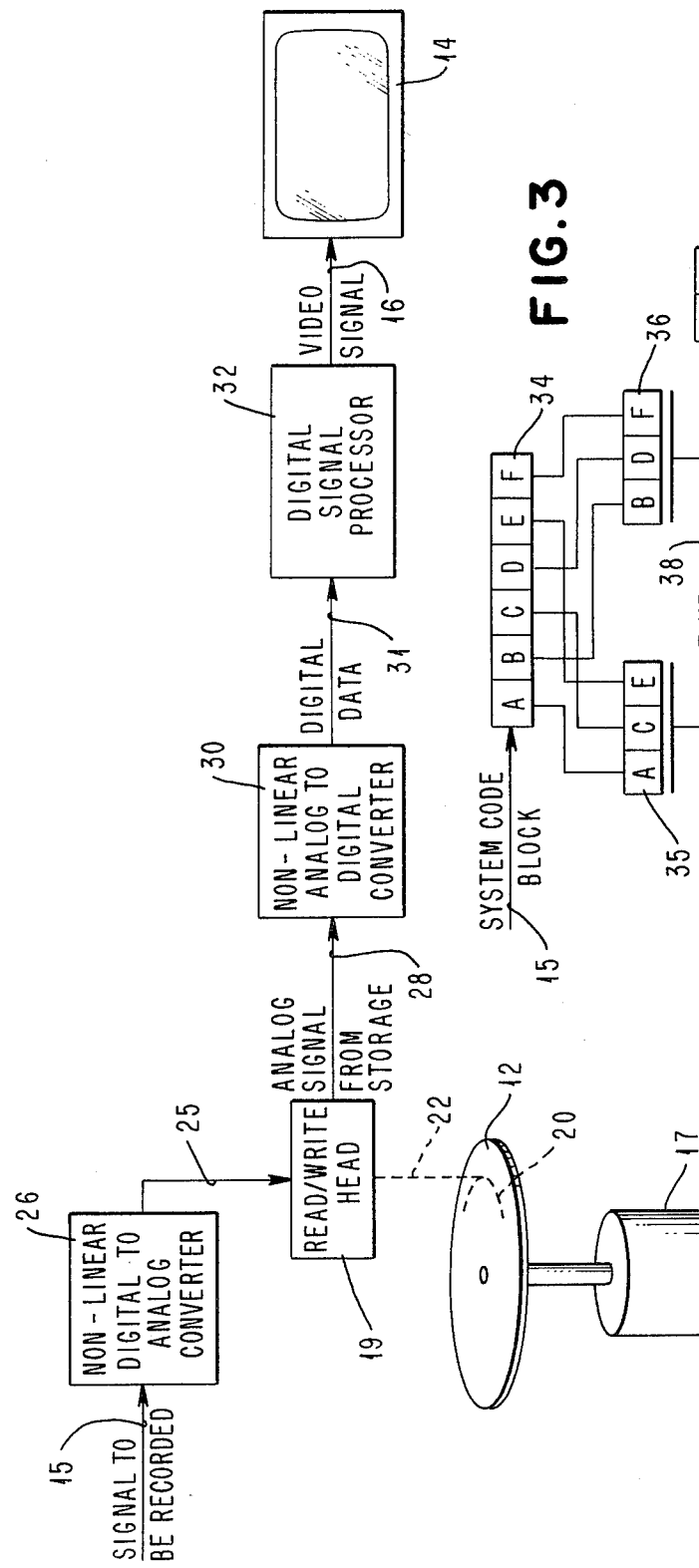

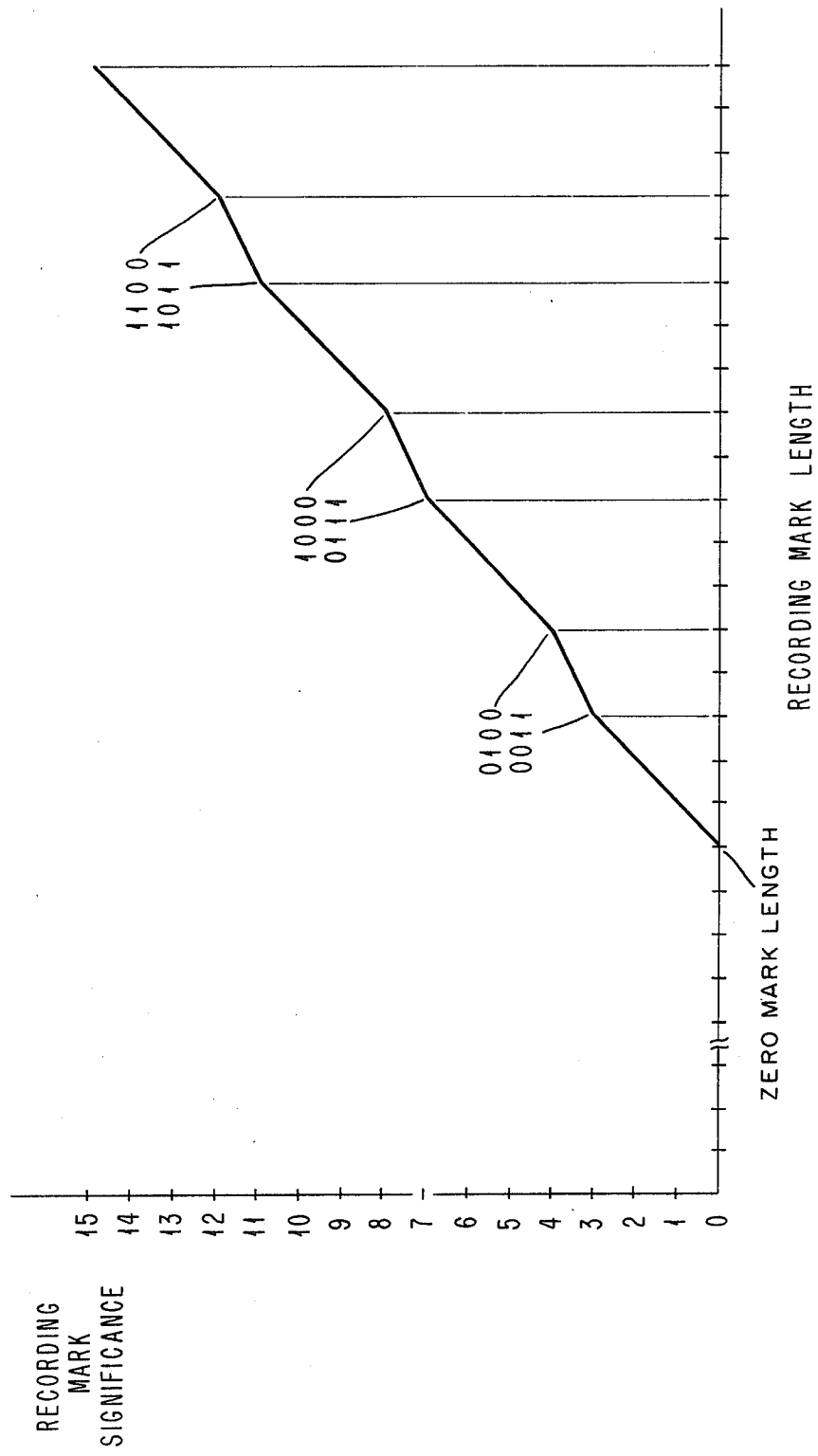

VIDEO PLAYER/RECORDER WITH NON-LINEAR MARK LENGTH MODULATION

RELATED APPLICATIONS

Our application Ser. No. 814,017, U.S. Pat. No. 4,161,753, entitled "Video Recording Disk with Interlacing of Data for Frames on the Same Track", filed July 8, 1977, describes a video record and an associated player system. Our application Ser. No. 973,839 entitled "Video Player And/Or Recorder With Hadamard Transform", filed on Dec. 28, 1978, discloses data compression apparatus for a video player and/or recorder. These applications have helpful background information and are incorporated by reference in this specification.

INTRODUCTION

Coding Video Information

It has been proposed in the prior art to divide a television picture into an array of points to sample the values of the Y, I, and Q signals, and to store this information on a video disk as a sequence of marks and intervening spaces that are modulated in length to represent the digital values. For example, the length of the recording mark can be varied according to the amplitude of the luminance signal at a corresponding point on the television screen. The amplitude of the luminance signal and the length of the mark can both be thought of as analog signals in this introductory explanation, but there are advantages in digitizing the amplitude of the luminance signal and correspondingly, it is convenient to think of the marks as at least approximately varying in discrete increments that correspond to successive digital values.

One of the reasons for digitizing the luminance values is that the digitized values can be compressed by a matrix operation that may be for example a Hadamard Transform. For example, the video picture can be organized as a number of eight by eight matrices of sixty-four points on the face of a picture tube. (This matrix is called the X matrix). Each of these points would be represented initially by a digital code of say six bits that would represent sixty-four gray levels at the corresponding point on the television raster. A matrix multiplication produces another matrix, called the G matrix, in which some of the elements or coefficients have relatively large, significant, numerical values and other elements have small values. Data compression is possible because it is not necessary to actually store the small values on the disk and because some of the other terms of the G matrix can be satisfactorily represented by truncated or shortened binary codes. The compression matrix that is stored on the disk is called the G* matrix. In the player, there is a matrix multiplication that produces the original X matrix with only a slight difference in picture quality that is generally not detectable.

A characteristic of this data compression technique that is significant in understanding this invention is that more bits are assigned to storing the more significant coefficients than are assigned to storing the less significant coefficients. (The assignment is either standard so that the sequence of bits read from the record can be assigned to the proper coefficients of the G* matrix or the disk carries this information and it is loaded into a control section of the player.) To understand how the longer code blocks of the player/recorder system are represented by the shorter codes of the modulated marks, it will be helpful to first review some of the features of this modulation technique.

Suppose that the marks that are to be recorded on a video disk are to be modulated in length to represent a code of three bits. There are eight of these code blocks and they can be presented in the binary counting sequence 000, 001, 010 ... 111. A mark has a minimum length that is necessary in order for the mark to be detected by the read apparatus of the player, and this minimum length represents zero, or 000 in the format of the three bit code block. The longest mark length represents the highest code value, 111 (or decimal 7) and intermediate increments of length represent the intermediate values of the code, 001 through 110.

It has been proposed to modulate the length of the mark and to maintain a constant space from the beginning of one mark to the beginning of the next mark or to modulate the length of the mark and maintain a constant space between marks or to modulate both the length of a mark and the length of the space. The invention is applicable to any of these techniques and for simplicity the techniques will all be described generally in terms of modulating the length of a mark without limitation as to any data significance of the intervening space.

A further question of terminology concerning this data representation technique can now be explained. Commonly, video disks are intended to be rotated at a constant angular velocity that permits one television frame to be stored on each track revolution. In such a system, a mark on an inner track is shorter than the equivalent mark on an outer track but equivalent marks have the same angular length and the timing for equivalent marks is the same whether they are on an outer track circle or an inner track circle. In electronic circuits that generate the data signals for the video write apparatus, it is customary to refer to this modulation technique as pulse width modulation since only the timing of the pulses is significant and the variation in mark length that occurs according to the radius of the write operation is not apparent. It has also been proposed in the prior art to maintain equal data density along each data track without regard to the radius of the track and to slow the record as the read or write operation proceeds radially inward in order to compensate for the change in track radius. In such a system, the timing for the marks and the physical length of the marks is constant across the radius of the record. The apparatus of this invention is applicable to either of these recording techniques and it will ordinarily be helpful to refer to the length of a pulse or the length of a mark interchangeably as though the operation was along a constant radius track of a constant speed record or at any point on a variable speed record.

Mark length modulation is an efficient data storage technique because relatively inexpensive optical systems can distinguish very small increments of length beyond a minimum length that is required for detection. The marks can be modulated to represent code blocks of a selected number of bits (the codes are not efficient for very long code blocks) and code blocks of three or four bits will be used in most of the examples in this specification. A feature of these codes that is significant in this invention is that a three-bit code is a subset of a four-bit code, and mixed block lengths can be used in the record writing apparatus without any change in the read apparatus.

As the explanation has proceeded so far, it can be seen that a digital code block of eight bits (for example)

in the player system can be represented by two marks on the data track and that each of these marks can be interpreted as a four-bit code. Next it will be explained how errors occur in writing or reading the length of a mark as an introduction to a later description of how the player and record of this invention minimize the effects of these errors.

Reading these marks is a kind of analog-to-digital conversion and there are a number of techniques for reading the marks. If the marks and the increments are made small in order to increase the storage density, there is a statistical chance of misreading or miswriting a mark length and thereby signaling a wrong code block. The errors in the recording are further increased by the fact that the marks may be somewhat irregular in shape as the result of imperfections in the recording process and the beginning and end of the mark may be somewhat rounded and non-uniform in shape. For example, consider the operation of reading a mark representing a three-bit code. If the mark length is half-way between the length for a four and five (100 and 101) there is no way of evaluating the mark, and whether the system reads the mark as a four or five depends on the particular analog-to-digital conversion technique that is used in the circuit.

Conversely, considering errors from the standpoint of a write operation, when a mark is to be recorded in a length to signify a 101 (decimal 5) an error in the write operation might cause the mark to be recorded shorter in the range of length for a 100 (decimal 4) or to be recorded longer in the range of length for a 110 (decimal 6).

An object of this invention is to provide a new video disk recorder and player and record in which the effect of these errors is minimized.

SUMMARY OF THE INVENTION

One of the advantages of the mark length coding technique that has been described so far is that ordinarily an error in mark length is only between two adjacent numbers. For example an intended four would sometimes be recorded or read in error as a five or a three, but only much more rarely would a four be read as a two or a six.

When two marks are used to represent a multi-bit code block, we have found that it is advantageous to assign bits of the system code to bits of the code that is represented by the two storage code marks in a way that takes this ambiguity into account. As one example, if a six-bit code is represented as ABCDEF, where A is a high order digit and F is a low order bit, it is advantageous to code the two marks as ACE and BDF. (Other examples will be explained later.) Any ambiguity about the length of one or both of the code marks will tend to affect the low order bits of the system code. By contrast, if the two marks are coded ABC and DEF, an ambiguity about the length of the first mark would have a substantially larger effect on the system code.

When the longer code blocks of the system are assigned to two (or more) shorter codes that are represented in storage by pulse length modulated marks, some ambiguities in mark length affect only the low order bit position or the next to the low order bit position of the system code. For example, if the code BDF is read as a four instead of a five (or vice versa) and the storage code ACE is read correctly, the system code ABCDEF is incorrect only in the low order bit position for an error of one part in sixty-four for a six-bit system code or one part in two hundred fifty-six in an eight-bit system code. Similarly, some errors affect the second bit position of the storage code, for example when a five (101) is read as a six (110).

The most significant error causes a change in the high order bit position of the storage code. In a three-bit code this error occurs when there is an error between a three (011) and a four (100). In a four-bit code, an error in the third bit position occurs between three and four and also between eleven (1011) and twelve (1100), and the high order bit of a four-bit code is affected by an ambiguity between a seven (0111) and an eight (1000).

In the system of this invention, the increment between mark lengths where the most significant error occurs is made larger than the other increments to reduce the actual likelihood that this ambiguity will occur. It is not necessary to make the other increments shorter, but if the other increments are made proportionately shorter to preserve the overall data recording density, the decreased likelihood of ambiguity between the selected increment lengths more than offsets the increased likelihood of ambiguity at the other mark lengths and a substantial improvement in the error rate is achieved. A non-linear read apparatus is provided for detecting these marks.

THE DRAWINGS

FIG. 1 is a schematic drawing of a video player/recorder system showing the apparatus of this invention for writing and reading non-linear mark lengths.

FIG. 2 is a graph explaining the non-linear circuits of FIG. 1.

FIG. 3 is a schematic of a representative circuit for translating a system code block into two disk code blocks.

THE APPARATUS OF THE DRAWING

The Video Player/Recorder System—FIG. 1

FIG. 1 shows a video disk 12, a television set 14, and components for writing on the disk according to a signal on a line 15 and for reading from the disk and producing a video signal on a line 16 for the television set. Disk 12 is driven by a motor 17. It will be convenient to consider that the motor drives the disk at a uniform angular velocity that corresponds to one television frame per revolution. A read/write head 19 optically scans a representative track 20 with a laser beam represented by dashed line 22. For a write operation, the laser beam selectively alters the material of disk between reflective and non-reflective states (or between transparent and non-transparent states). As a specific example, the disk may have a thin layer of tellurium on a glass substrate and the laser may burn holes in the tellurium to form marks that are transparent on a non-transparent background.

For a write operation, the laser beam is modulated according to a pulse length signal on a line 25 that is produced by a digital to analog converter 26 in response to the signal to be recorded. The apparatus for recording on the disk 12 that have been described so far are conventional except for the fact that the digital to analog converter of the drawing is nonlinear as will be explained later. In other respects, this apparatus is conventional and it illustrates a variety of recording systems that can use the apparatus of this invention.

During a read operation, the record is illuminated from the read/write head and reflected (or transmitted)

light travels from the track being read along dashed line 22 to the read/write head which produces an analog signal on a line 28. The analog signal is binary in amplitude and is up (arbitrarily) when a mark passes under the read/write head and is down when a space travels under the read/write head. A non-linear analog to digital converter 30 receives the signal on line 28 and produces a multi-bit digital data output on line 31. This digital signal is operated on by digital signal processor 32 to produce a video signal on line 16. In a simple application of the invention, the multi-bit blocks on line 31 represent the Y, Q, and I signals at a point on the television raster and the audio signal and these values are used directly to modulate a video carrier signal. However, other features of the invention are particularly intended for a system in which the digital data on line 31 in part represents coefficients of a Hadamard Transform that is used for data compression. Except for the fact that the analog to digital converter 30 is non-linear, the features of the player that have been described are conventional and illustrate a variety of video record players or combined video record player/recorders to which this invention is applicable.

System Code To Disk Code Conversion—FIG. 3

In FIG. 3, the system associated with a disk supplies on line 15 a six-bit code block that is to be written on the disk as two marks, and the apparatus of FIG. 3 produces on a line 33 two code blocks of three-bits each that represent these marks in subsequent operations of the digital to analog converter 26. The six bits in the system format are designated A (the high order bit) through F (the low order bit). A six-bit register 34 initially stores the system code block. The contents of register 34 are transferred to two registers 35, 36 of three bits each on lines that are skewed to produce the sequence ACE in register 35 and the sequence BDF in register 36. (Gating circuits that are conventional for register to register transfers are not shown in the drawing.) A set of gates 37 transfers the contents of registers 35, 36 in sequence to a three-bit output bus 37 under control of suitable timing signals, time 1 and time 2, on lines 38, 38. The registers 34, 35, 36 are presented in FIG. 3 to better show the flow of data; register 34 may be an existing register of the system and registers 35, 36 may be replaced by one register of the analog to digital converter with sequentially operated gating circuits or by the equivalent of two registers 35, 36 in the converter. FIG. 3 is representative of a variety of well know techniques for assembling bits into particular formats, and similar circuits for transferring between four-bit code blocks and eight-bit code blocks and circuits for reforming two codes from the disk to a single longer code for the associated system will be readily apparent.

The Non-Linear Converters, 26 and 30—FIG. 2

In the graph of FIG. 2, the horizontal axis shows the increments in the length of a recorded mark and the vertical axis shows the numerical value of the mark. For the analog to digital converter 30 the horizontal axis represents the input and the vertical axis represents the output and for the digital to analog converter 26 the vertical axis represents the input and the horizontal axis represents the output.

It will be helpful to consider FIG. 2 first in relation to a conventional, linear, converter. In one well known conversion technique that is suitable for the apparatus of this invention, an oscillator supplies clock signals at intervals that correspond to the increments of length of the recorded marks. In a conventional, linear, converter for analog to a four-bit digital code, a counter is reset and gated to begin counting clock pulses at the beginning of the analog mark and to stop counting at the end of the mark. The value in the counter at the end of this time, minus the count for a zero signifying mark is the digital value of the analog signal. For linear digital to analog conversion, the counter is gated on to start the analog mark and is gated off to terminate the mark when the count equals the digital code plus the fixed count for the zero length mark. There are many variations of this general design; for example, the counting function is often provided by ramp generating circuits.

In the non-linear converter of FIG. 2, the break in the horizontal axis shows that any desired count can be assigned to the mark for the zero code (0000). The next three digital codes, 0001, 0010, and 0011 are represented by successive increments of length, as is conventional. The code for four (0100) however is given one additional increment so that in the conventional linear converter that has been described a four would be read as a five and a four would be represented by the intermediate increment which is not assigned a code value.

Similarly, there are two increments of mark length between seven and eight (0111 and 1000) and between eleven and twelve (1011 and 1100).

An analysis has been made of the frequency of errors with the assumptions (1) that a mark that is in error is equally likely to be too long or too short, (2) that the marks for all numerical values are equally likely to be in error, and (3) that the error rate is a function of increment length. We have found that in these circumstances errors in the system codes are significantly reduced by the non-linear mark length assignments and that the improvement is also significant when the intervals of mark length are shortened to maintain the storage density, even though there will be an increase in the error rate for the codes that are represented by a shortened increment of length (including an increase in double errors such as a change from length 0 to length 2). (Increments are shortened by shortening the period of the clock oscillator.)

The conventional linear converter that has been referred to in this description can be modified in several ways to give the non-linear relationship of FIG. 2. As an example of a four-bit non-linear digital to analog converter, a read-only store of sixteen words is addressed by the four-bit code that is to be stored on the disk. The work that is fetched from the read-only store is applied to the conventional digital to analog converter. The read-only store has the following entries.

| Address | Storage Contents |
| --- | --- |
| 0000 (0) | 00000 (0) |
| 0001 (1) | 00001 (1) |
| 0010 (2) | 00010 (2) |
| 0011 (3) | 00011 (3) |
| 0100 (4) | 00101 (5) |
| 0101 (5) | 00110 (6) |
| 0110 (6) | 00111 (7) |
| 0111 (7) | 01000 (8) |
| 1000 (8) | 01010 (10) |
| 1001 (9) | 01011 (11) |
| 1010 (10) | 01100 (12) |
| 1011 (11) | 01101 (13) |
| 1100 (12) | 01111 (15) |
| 1101 (13) | 10000 (16) |
| 1110 (14) | 10001 (17) |

| Address | Storage Contents |
| --- | --- |
| 1111 (15) | 10010 (18) |

Conversely, the non-linear analog to digital converter may comprise a conventional, linear, analog to digital converter and the output of the converter is a five-bit code in the set that is shown under the heading "Storage Contents" in the listing for the non-linear digital to analog converter. The read-only store may have thirty-two storage locations with the sequence 0000 through 1111 stored at the sixteen locations that are addressed by the sixteen possible outputs of the conventional analog to digital converter.

System Code Bit Assignment

Notice that the three-bit code is a sub-set of the four-bit code and that the analog to digital and digital to analog converters for four-bit codes will operate without change with three-bit codes. That is, the system for either the video recorder or the video player will operate with a mix of three and four-bit storage codes. The bit assignment apparatus of FIG. 3 can be constructed to use this capability advantageously in a system in which video data is compressed by Hadamard transform or other matrix multiplication technique. Suppose that the transform is based on an eight by eight matrix and that by data compression, the number of bits can be reduced from three hundred twenty-four for the G matrix (the transform of the picture matrix) to 92 bits for the G* matrix (the matrix which is stored on the disk as marks of modulated length). These 92 bits are distributed among a few elements of the G* matrix with eight bits for the most significant elements, seven bits for the next most significant elements, and so on. Thus, the comparator of a recorder produces (and the decompactor of a player receives) a sequence of bits in groups of 92 bits in which each bit has a specific position in a specific multi-bit element of the G* matrix, but the boundaries between these units do not in general fall on boundaries of eight bits. The eight-bit units are coded as two storage codes of four bits each and the six-bit system codes are stored as two storage codes of three bits each, as has already been explained. The seven-bit units of the G* matrix are stored as a three-bit and a four-bit code. Alternatively, a five-bit system code can be stored as a five-bit storage code in a single mark. Similarly, three and four-bit system codes can be stored directly as three and four-bit storage codes. Shorter system codes that are adjacent in the bit sequence can be handled as longer system codes to be represented by two or more storage codes.

A circuit for assigning bits in a long bit stream to the storage code bits can have a long (eg. 92 bits) register like register 34 with a corresponding number of gates. Functionally equivalent circuits adapted to a particular player/recorder will be readily apparent.

As the system has been described so far, the length of a recording track will vary with the data content. However, the information for a frame of video information or a sub unit of a frame must occupy a substantially fixed portion of the recording track to keep the data synchronized with the television display or signal source. One technique for maintaining suitably equal track lengths is to modulate only the length of the mark and use the space to maintain synchronous recording. A preferable technique is to modulate both the mark and the space and to record either the original data (eg. 1111, 1110 ...) or the complement (eg. 0000, 0001) to maintain the data length within the length of the track. A bit in the header for the data segment identifies to the player whether the data that is read from the disk is to be complemented.

The apparatus of this invention will improve storage capacity and/or reduce the error rate in a video player or recorder. It is also useful in other apparatus that use mark length or pulse width modulation to represent digital codes. Many variations in the specific details of the apparatus that has been described will be apparent to those skilled in the art within the scope of the claims.

Having thus described our invention, what we claim as new, and desire to secure by Letters Patent is:

1. A system such as a video player or recorder including a storage medium such as a video disk having marks that are modulated in increments of length to represent a storage code block of n bits and where the system operates in code blocks of m bits, where m is greater than n, the improvement comprising:
    means for translating in at least one direction between a system code block and a plurality of storage code blocks with a plurality of high order bits of a system code block being located in a high order bit position of each of a plurality of storage code blocks, and
    means for transmitting the storage code blocks sequentially in at least one direction between the translating means and the storage medium.

2. The system of claim 1 as a video recorder including:
    means for writing on a storage medium such as a video disk to form marks that are modulated in increments of length to represent a storage code block of n bits and where the system operates in code blocks of a variable block size;
    means for assigning bits of a system code block to a plurality of storage code blocks with high order bits of the system code block assigned to a high order bit position of a plurality of storage code blocks, and
    means for supplying the storage code blocks sequentially to the system writing means.

3. The video recorder of claim 2 wherein said writing means includes means for modulating said marks in increments of length to represent a binary code block of n bits in which the increment of length is greater between the two binary codes for which there is a transition in a high order bit position than between two binary codes in which there is a transition only in the low order bit positions.

4. The video recorder of claim 2 including,
    means supplying said system code blocks as a substantially continuous bit stream, and
    means for assigning bits of said bit stream to bit positions of the storage code blocks according to the position of the bits in the system code blocks with a plurality of high order bits of a system code in high order bit positions of a plurality of storage codes.

5. The system of claim 4 wherein said storage codes are four-bit codes and wherein said player means includes means for converting the mark lengths non-linearly according to greater increments of length between mark lengths representing codes 0011 and 0100, 0111 and 1000, and 1011 and 1100.

6. A video disk player system, comprising:
a video disk having information stored along data tracks as marks that are modulated in length to represent a multi-bit binary code block,
player means for reading the length of the marks along the track and for producing the corresponding multi-bit storage code blocks,
means for forming system code blocks in which high order bits of a plurality of storage code blocks are assigned to the high order bit positions of a single system code block, and
means for processing the system code blocks to form a video signal for a television set.

7. The video disk player system of claim 6 wherein:
said marks are modulated in increments of length to represent a binary code block of n bits, the increment of length being greater between the two binary codes for which there is a transition in a high order bit position than between two binary codes for which there is a transition only in the low order bit positions, and wherein said player system includes,
player means for converting mark lengths non-linearly to produce an n bit code block.

8. A video record of the type in which marks along a data track are modulated in increments of length to represent data according to code blocks of n bits, wherein the improvement comprises:
marks representing the code in which a high order bit becomes a 1 in a normal binary counting sequence having a first increment of length over the marks for the preceding code in the counting sequence in which the high order bit is a binary 0, and
marks for other codes having a shorter increment of length over the marks for the preceding code.

* * * * *